United States Patent
Li et al.

(10) Patent No.: US 11,041,614 B2
(45) Date of Patent: Jun. 22, 2021

(54) WAVELENGTH CONVERSION UNIT AND LIGHTING DEVICE

(71) Applicant: DELTA ELECTRONICS, INC., Taoyuan (TW)

(72) Inventors: Jih-Chi Li, Taoyuan (TW); Wen-Cheng Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/835,264

(22) Filed: Mar. 30, 2020

(65) Prior Publication Data
US 2021/0140619 A1    May 13, 2021

(30) Foreign Application Priority Data
Nov. 7, 2019  (CN) .......................... 201911084003.7

(51) Int. Cl.
| | |
|---|---|
| *F21V 29/502* | (2015.01) |
| *F21V 29/71* | (2015.01) |
| *G02B 26/00* | (2006.01) |
| *F21V 9/45* | (2018.01) |

(52) U.S. Cl.
CPC .............. F21V 29/502 (2015.01); F21V 9/45 (2018.02); F21V 29/713 (2015.01); G02B 26/008 (2013.01)

(58) Field of Classification Search
CPC ........ F21V 29/502; F21V 29/713; F21V 9/45; F21V 1/17; F21V 3/08; F21V 3/12; F21V 5/10; F21V 7/30; F21V 7/26; F21V 9/30; F21V 9/32; F21V 9/38; F21V 13/08; F21V 13/14; G02B 26/008; F21K 9/64; G02F 2001/133614; G03B 21/204; H01L 33/50

See application file for complete search history.

(56) References Cited

U.S. PATENT DOCUMENTS

| | | | |
|---|---|---|---|
| 2014/0185269 A1* | 7/2014 | Li ............................ | G02B 6/00 362/84 |
| 2017/0351166 A1* | 12/2017 | Zhao .................... | G03B 21/208 |
| 2018/0088317 A1 | 3/2018 | Yoshikawa | |

FOREIGN PATENT DOCUMENTS

| | | |
|---|---|---|
| CN | 107608168 A | 1/2018 |
| CN | 108983538 A | 12/2018 |
| WO | 2014/188645 A1 | 11/2014 |

\* cited by examiner

*Primary Examiner* — Joseph L Williams
*Assistant Examiner* — Jose M Diaz
(74) *Attorney, Agent, or Firm* — CKC & Partners Co., LLC

(57) ABSTRACT

A lighting device includes a wavelength conversion unit, a driving unit, and a light source. The wavelength conversion unit includes a main body and a fluorescent powder layer. The main body has a cylindrical outer surface. The fluorescent powder layer is disposed on the cylindrical outer surface. The driving unit is configured to drive the wavelength conversion unit to rotate around an axis. The cylindrical outer surface surrounds the axis. The light source is configured to emit light toward the fluorescent powder layer.

19 Claims, 9 Drawing Sheets

WAVELENGTH CONVERSION UNIT AND LIGHTING DEVICE

CROSS-REFERENCE TO RELATED APPLICATION

This application claims priority to China Application Serial Number 201911084003.7, filed Nov. 7, 2019, which is herein incorporated by reference.

BACKGROUND

Technical Field

The present disclosure relates to a wavelength conversion unit and a lighting device.

Description of Related Art

Most conventional wavelength conversion devices disclose using a color wheel disk, and a fluorescent powder layer is coated on the disk surface of the color wheel disk. In order to dissipate the heat, some prior arts disclose installing a cooling module on the back of the color wheel disk to conduct the heat away from the color wheel disk. The foregoing cooling module is a heat exchange fin, for example.

However, for the foregoing prior arts of using the color wheel disk with the heat exchange fin, the overall occupied space is large, which is not conducive to the layout of internal components of the lighting device using the conventional wavelength conversion device.

Accordingly, how to provide a wavelength conversion unit and a lighting device to solve the aforementioned problems becomes an important issue to be solved by those in the industry.

SUMMARY

An aspect of the disclosure is to provide a wavelength conversion unit and a lighting device which can effectively solve the aforementioned problems.

According to an embodiment of the disclosure, a wavelength conversion unit includes a main body and a fluorescent powder layer. The main body has a cylindrical outer surface. The fluorescent powder layer is disposed on the cylindrical outer surface.

In an embodiment of the disclosure, the main body has a through channel. The cylindrical outer surface surrounds the through channel.

In an embodiment of the disclosure, the wavelength conversion unit further includes a blade group. The blade group is disposed in the through channel and fixed to the main body.

In an embodiment of the disclosure, a material of the fluorescent powder layer includes aluminate, silicate, nitride, or quantum dots.

In an embodiment of the disclosure, a material of a binder used in the fluorescent powder layer includes silicone, epoxy resin, aluminum oxide, or aluminum nitride.

According to an embodiment of the disclosure, a lighting device includes the foregoing wavelength conversion unit, a driving unit, and a light source. The driving unit is configured to drive the wavelength conversion unit to rotate around an axis. The cylindrical outer surface surrounds the axis. The light source is configured to emit light toward the fluorescent powder layer.

In an embodiment of the disclosure, the driving unit is connected to the blade group.

In an embodiment of the disclosure, the through channel has a first opening and a second opening opposite to each other. The lighting device further includes a pipeline and a thermal fluid. The pipeline has a first end and a second end. The first end and the second end are respectively coupled to the first opening and the second opening, such that the through channel and the pipeline together form a fluid path. The thermal fluid is located in the fluid path.

In an embodiment of the disclosure, the thermal fluid is gas or liquid.

In an embodiment of the disclosure, the lighting device further includes a first engaging member and a second engaging member. The first engaging member is rotatably engaged and hermetically communicated between the first opening and the first end of the pipeline. The second engaging member is rotatably engaged and hermetically communicated between the second opening and the second end of the pipeline.

In an embodiment of the disclosure, the lighting device further includes a heat exchange module. The heat exchange module is thermally connected to the pipeline.

In an embodiment of the disclosure, the lighting device further includes a transmission member. The transmission member is engaged with the cylindrical outer surface. The driving unit drives the wavelength conversion unit to rotate through the transmission member.

According to an embodiment of the disclosure, a lighting device includes a light source, a wavelength conversion unit, and a beam splitter. The light source is configured to generate an excitation light. The wavelength conversion unit has at least one fluorescent section with fluorescent powder for converting the excitation light into an excited light. The wavelength conversion unit is configured to rotate about an axis. A direction in which the excitation light is emitted to the wavelength conversion unit is orthogonal to the axis. The beam splitter is configured to reflect the excitation light and allow the excited light to pass through, or configured to reflect the excited light and allow the excitation light to pass through.

In an embodiment of the disclosure, the at least one fluorescent section is plural in number. The fluorescent sections are annularly arranged around the axis. The fluorescent powders respectively on the fluorescent sections are different.

In an embodiment of the disclosure, the wavelength conversion unit further has a reflective section. The at least one fluorescent section and the reflective section are annularly arranged around the axis.

In an embodiment of the disclosure, the lighting device further includes a driving unit. The driving unit is configured to drive the wavelength conversion unit to rotate around the axis.

In an embodiment of the disclosure, the wavelength conversion unit has a through channel.

In an embodiment of the disclosure, the lighting device further includes a blade group. The blade group is configured to rotate to drive a fluid through the through channel.

In an embodiment of the disclosure, the blade group is disposed in the through channel and fixed to the wavelength conversion unit.

Accordingly, a wavelength conversion unit of which a main body has a cylindrical outer surface and a lighting device using the wavelength conversion unit are provided in the present disclosure. Compared with a conventional wavelength conversion device in which the fluorescent powder layer is coated on the front side of the color wheel disk, since the fluorescent powder layer of the wavelength conversion unit of the present disclosure is coated on the cylindrical outer surface, the lateral space occupied by the wavelength conversion unit can be effectively reduced. The main body of the wavelength conversion unit of the present disclosure can also be a hollow cylinder, that is, the main body has a through channel through which a thermal fluid (e.g., gas or liquid) can flow, and the through channel can be used as a heat-dissipating passage. In addition, the wavelength conversion unit of the present disclosure can further include a blade group disposed in the through channel. When a driving unit drives the main body to rotate, the blade group located in the through channel will also force the thermal fluid to pass through the through channel at the same time. Therefore, the wavelength conversion unit of the present disclosure can effectively dissipate a large amount of thermal energy generated when a light source (e.g., a laser light source) irradiates the fluorescent powder layer, and reduce the temperature of the fluorescent powder layer. In some embodiments in which the driving unit is connected to the blade group, the forced air can also dissipate the heat of the driving unit at the same time. Furthermore, since the lighting device of the present disclosure does not need to provide a heat exchange module in the inner housing, the overall volume of the inner housing can be smaller than those of prior arts, which is beneficial to the layout of internal components of the lighting device using the wavelength conversion unit of the present disclosure.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
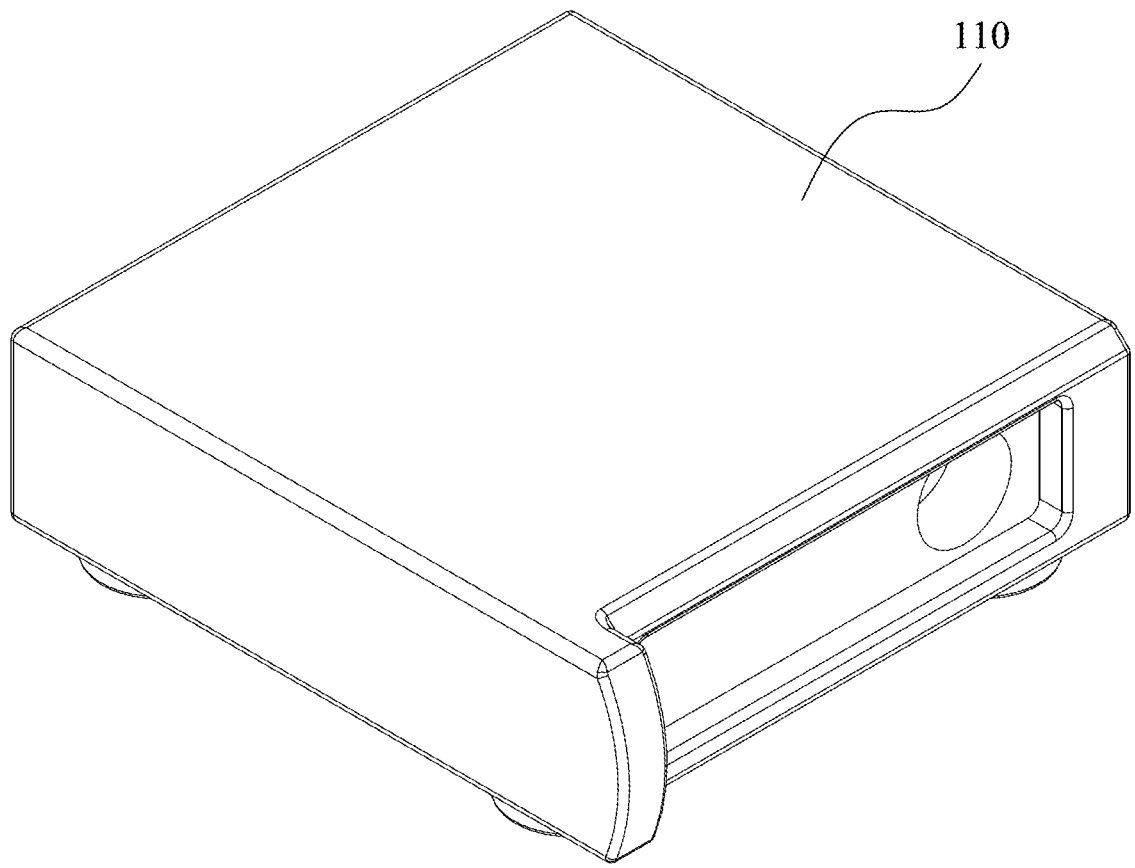
FIG. 1 is a perspective view of a lighting device according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 2:
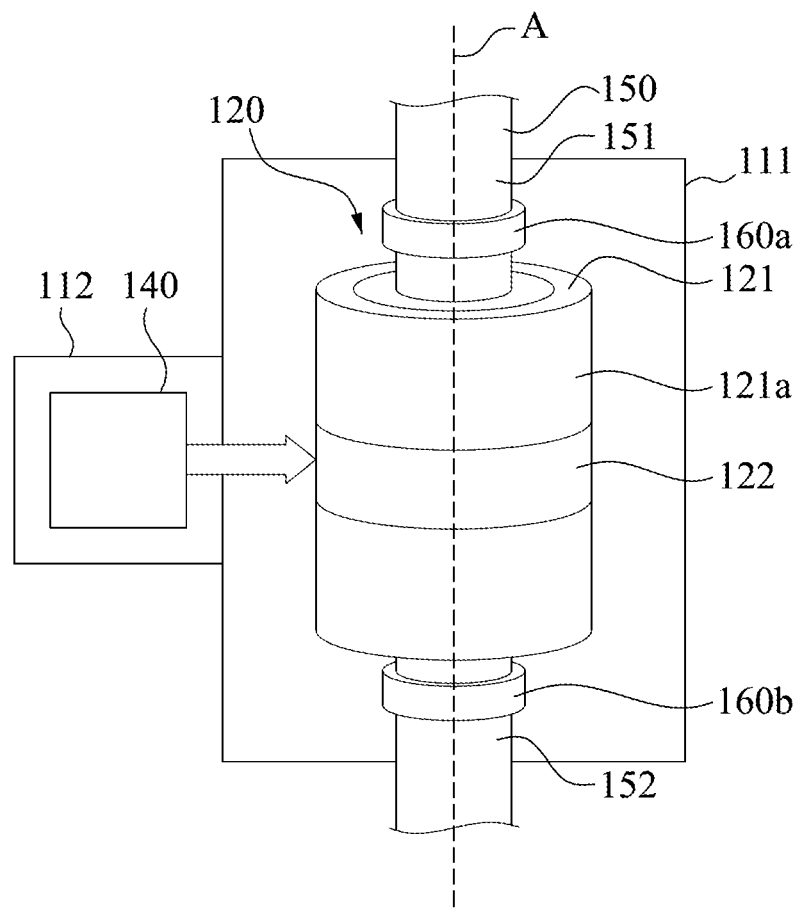
FIG. 2 is a schematic diagram of certain components included in the lighting device according to an embodiment of the present disclosure.

Reference is made to FIGS. 1 and 2. FIG. 1 is a perspective view of a lighting device 100 according to an embodiment of the present disclosure. FIG. 2 is a schematic diagram of certain components included in the lighting device 100 according to an embodiment of the present disclosure. As shown in FIGS. 1 and 2, in the present embodiment, the lighting device 100 is a projector for example, but the disclosure is not limited in this regard. The lighting device 100 includes an outer housing 110, inner housings 111, 112, a wavelength conversion unit 120, and a light source 140. The inner housings 111, 112 abut against each other. The wavelength conversion unit 120 and the light source 140 are respectively accommodated in the inner housings 111, 112, so as to prevent internal optical components from being contaminated by external dirt (e.g., dust in the air).

The wavelength conversion unit 120 includes a main body 121 and a fluorescent powder layer 122. The main body 121 has a cylindrical outer surface 121a. The material of the main body 121 is different from that of the fluorescent powder layer 122, and is preferably a material with a higher thermal conductivity, such as a metal or a thermally conductive ceramic. In the present embodiment, the cylindrical outer surface 121a of the main body 121 is a cylindrical surface, but the disclosure is not limited in this regard. In practical applications, the cylindrical outer surface 121a of the main body 121 can also be a tapered outer surface, or an outer surface having a cross section that is orthogonal to an axis A and has a regular polygon shape (not shown). The fluorescent powder layer 122 is disposed on the cylindrical outer surface 121a. The light source 140 is configured to emit light toward the fluorescent powder layer 122, and the direction of the emitted light is substantially orthogonal to the axis A. Specifically, the fluorescent powder layer 122 is disposed on the cylindrical outer surface 121a substantially along an annular path. Hence, when the wavelength conversion unit 120 rotates about its axis A and the light source 140 emits the light substantially toward this axis A, the light emitted by the light source 140 can be continuously irradiated onto the fluorescent powder layer 122 disposed along the annular path.

With the foregoing structural configurations, Compared with a conventional wavelength conversion device in which the fluorescent powder layer is coated on the front side of the color wheel disk, since the fluorescent powder layer 122 of the wavelength conversion unit 120 of the present embodiment is coated on the cylindrical outer surface (i.e., the fluorescent powder layer 122 is distributed around the axis A of the main body 121 along the traveling direction of the light emitted by the light source 140), the lateral space occupied by the wavelength conversion unit 120 can be effectively reduced (i.e., reducing the space occupied by a plane orthogonal to the traveling direction of the light emitted by the light source 140), which is conducive to the layout of internal components of the lighting device 100.

In some embodiments, the foregoing light source 140 is a laser light source, but the disclosure is not limited in this regard.

In some embodiments, a material of the fluorescent powder layer 122 includes aluminate (e.g., YAG), silicate, nitride, or quantum dots, but the disclosure is not limited in this regard.

In some embodiments, a material of a binder used in the fluorescent powder layer 122 can be organic or inorganic, in which the organic material may be silicone, epoxy resin, or the like, and the inorganic material may be aluminum oxide, aluminum nitride, or the like, but the disclosure is not limited in this regard.

Figure 3:
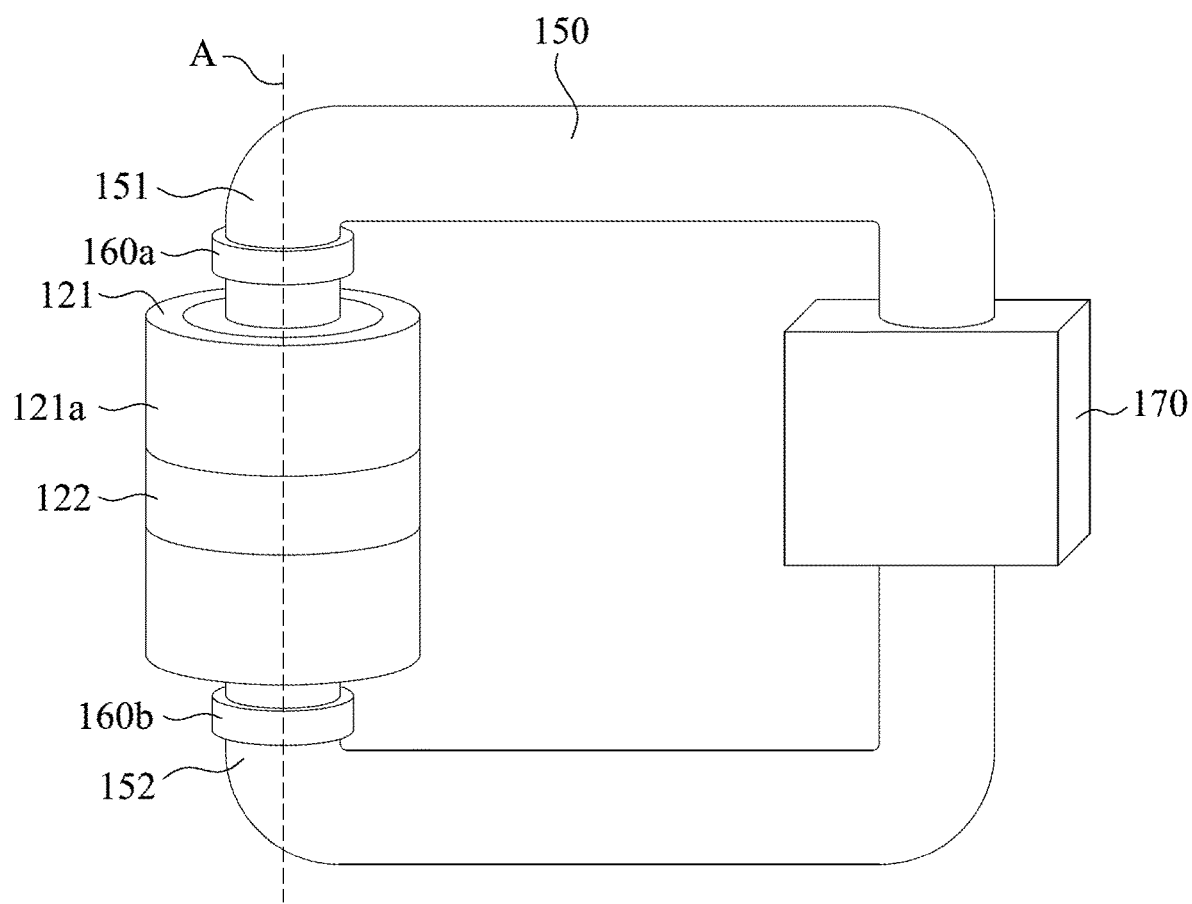
FIG. 3 is a schematic diagram of certain components included in the lighting device according to an embodiment of the present disclosure.
Figure 4:
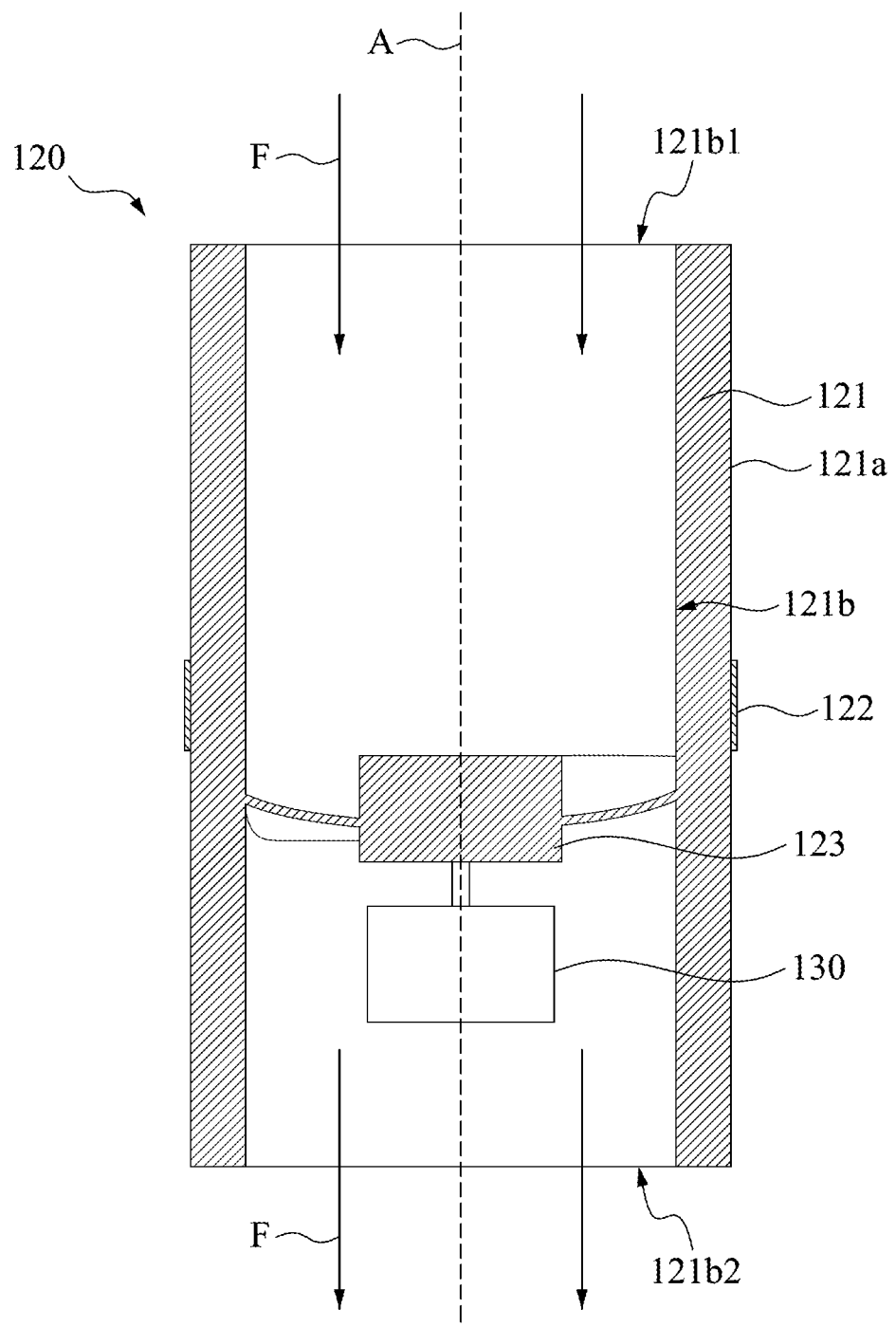
FIG. 4 is a partial cross-sectional view of the structure shown in FIG. 3 according to an embodiment of the present disclosure.

Reference is made to FIGS. 3 and 4. FIG. 3 is a schematic diagram of certain components included in the lighting device 100 according to an embodiment of the present disclosure. FIG. 4 is a partial cross-sectional view of the structure shown in FIG. 3 according to an embodiment of the present disclosure. As shown in FIGS. 3 and 4, in the present embodiment, the main body 121 of the wavelength conversion unit 120 has a through channel 121b. The through channel 121b substantially extends along the axis A. The cylindrical outer surface 121a surrounds the through channel 121b. In other words, the main body 121 of the wavelength conversion unit 120 is a hollow cylinder. With the structural configuration, the through channel 121b of the main body 121 can be configured for a thermal fluid F to flow through and can be used as a heat-dissipating passage.

As shown in FIG. 4, in the present embodiment, the wavelength conversion unit 120 further includes a blade group 123 and a driving unit 130. The blade group 123 is disposed in the through channel 121b of the main body 121 and fixed to the main body 121. For example, the blade group 123 may include a plurality of blades. These blades may be radially arranged. The driving unit 130 is configured to drive the wavelength conversion unit 120 to rotate around the axis A. Specifically, the driving unit 130 is connected to the blade group 123 and coupled to the main body 121 through the blade group 123. With the structural configurations, when the driving unit 130 drives the main body 121 to rotate through the blade group 123, the blade group 123 located in the through channel 121b will simultaneously disturb the thermal fluid F or forcefully drive the thermal fluid F through the through channel 121b, so as to achieve the effect of forcibly dissipating heat to the wavelength conversion unit 120. Therefore, the wavelength conversion unit 120 of the present embodiment can effectively dissipate a large amount of thermal energy generated when the light source 140 irradiates the fluorescent powder layer 122, and reduce the temperature of the fluorescent powder layer 122. In addition, the forced thermal fluid F also flows through the driving unit 130, so the driving unit 130 can be cooled at the same time. In some other embodiments, the number of the blade group 123 may be two or more, or the blades may also include a thermally conductive material, such as metal, to further conduct heat from the fluorescent powder layer 122 through the main body 121 and the blade group 123 to the thermal fluid F to dissipate.

As shown in FIGS. 3 and 4, in the present embodiment, the through channel 121b has a first opening 121b1 and a second opening 121b2 opposite to each other. The lighting device 100 further includes a pipeline 150. The pipeline 150 has a first end 151 and a second end 152. The first end 151 and the second end 152 are respectively coupled to the first opening 121b1 and the second opening 121b2 of the through channel 121b, such that the through channel 121b and the pipeline 150 together form a fluid path. The thermal fluid F is located in the fluid path. With the structural configurations, when the driving unit 130 drives the main body 121 through the blade group 123 to rotate, the blade group 123 located in the through channel 121b will forcibly drive the thermal fluid F to circulate along the fluid path formed by the through channel 121b and the pipeline 150 together. It should be noted that one function of the blade group 123 is to drive the thermal fluid F through the through channel 121b, so the blade group 123 does not have to be coupled to the main body 121 and does not have to be provided in the through channel 121b in some other embodiments. For example, the blade group 123 may be attached to side(s) of the first opening 121b1 and/or the second opening 121b2 of the through channel 121b, and even if spaced a predetermined distance apart, the thermal fluid F in the fluid path can be forced to pass through the through channel 121b.

Furthermore, since the driving unit 130 will drive the wavelength conversion unit 120 to rotate, the pipeline 150 is statically disposed in the outer housing 110 of the lighting device 100. In order for the through channel 121b and the pipeline 150 to form the fluid path together, the lighting device 100 further includes a first engaging member 160a and a second engaging member 160b. The first engaging member 160a is rotatably engaged and hermetically communicated between the first opening 121b1 of the through channel 121b and the first end 151 of the pipeline 150, and the second engaging member 160b is rotatably engaged and hermetically communicated between the second opening 121b2 of the through channel 121b and the second end 152 of the pipeline 150, so as to realize the connection between the rotating wavelength conversion unit 120 and the stationary pipeline 150. In practical application, each of the first engaging member 160a and the second engaging member 160b may be a rotary bearing having an airtight design, but the disclosure is not limited in this regard.

In some embodiments, the driving unit 130 can be coupled to the stationary pipeline 150 (e.g., directly or indirectly coupled to an inner wall of the pipeline 150), so as to drive the wavelength conversion unit 120 to rotate relative to the pipeline 150.

In addition, as shown in FIG. 3, the lighting device 100 further includes a heat exchange module 170 (e.g., a heat sink or heat-dissipating fins). The heat exchange module 170 is thermally connected to the pipeline 150. Hence, the thermal fluid F which absorbs the thermal energy from the wavelength conversion unit 120 can be cooled through heat exchange through the heat exchange module 170. With reference to FIG. 2, since the lighting device 100 of the present embodiment does not need to provide the heat exchange module 170 in the inner housing 111, the overall volume of the inner housing 111 can be smaller than those of prior arts, which is beneficial to the layout of internal components of the lighting device 100 using the wavelength conversion unit 120 of the present embodiment.

In some embodiments in which the thermal fluid F uses a gas, the pipeline 150, the first engaging member 160a, and the second engaging member 160b may be directly replaced by an internal flow passage of the outer housing 110. In other words, in these embodiments, the fluid path may be constituted by the through channel 121b of the main body 121 and the internal flow passage of the outer housing 110 together.

Figure 5:
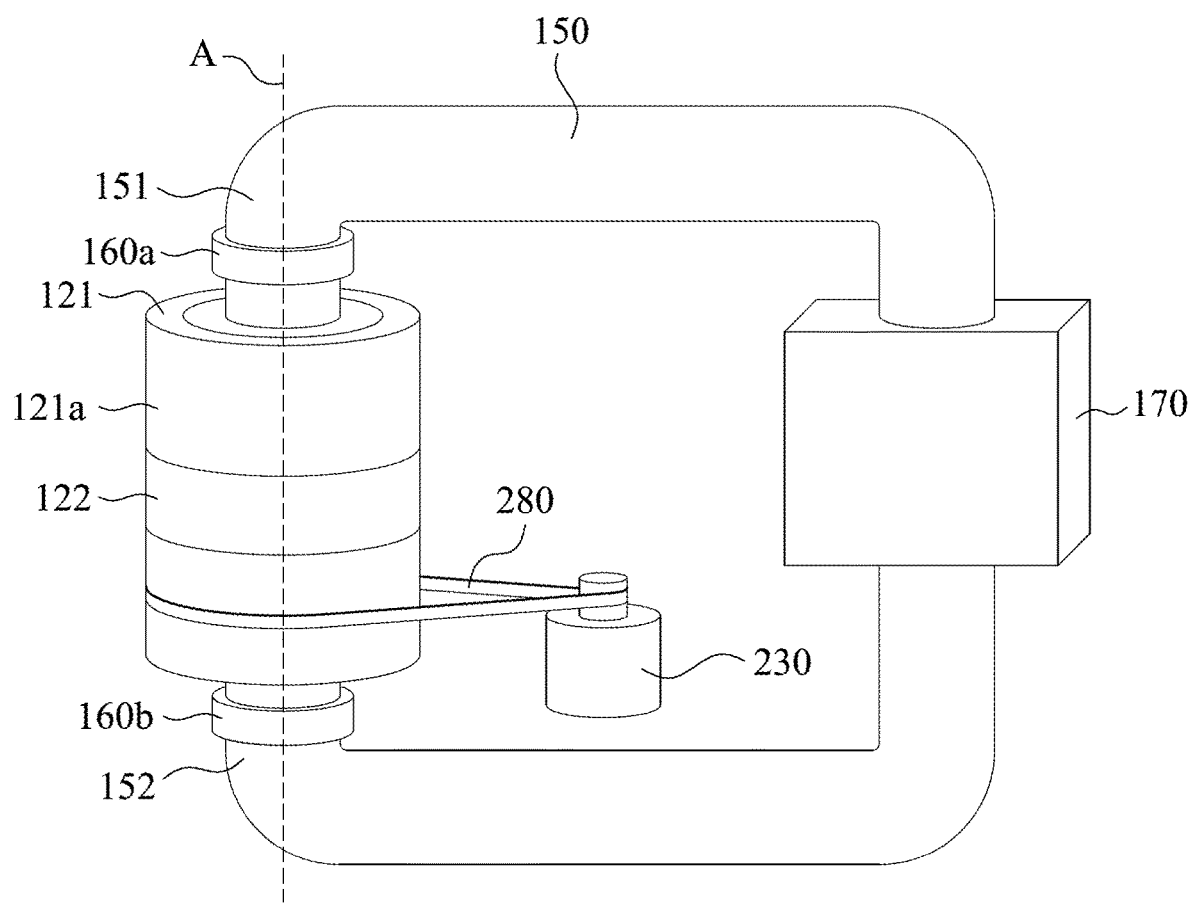
FIG. 5 is a schematic diagram of certain components included in the lighting device according to an embodiment of the present disclosure.

Reference is made to FIG. 5. FIG. 5 is a schematic diagram of certain components included in the lighting device 100 according to another embodiment of the present disclosure. As shown in FIG. 5, differences between the present embodiment and the embodiment shown in FIGS. 3 and 4 lie in that a driving unit 230 in the present embodiment is located outside the fluid path formed by the through channel 121b and the pipeline 150, and the lighting device 100 further includes a transmission member 280. The transmission member 280 is engaged with the cylindrical outer surface 121a of the main body 121. The driving unit 230 drives the wavelength conversion unit 120 to rotate through the transmission member 280.

In some embodiments, the transmission member 280 is a belt (as shown in FIG. 5) and is sleeved onto the cylindrical outer surface 121a of the main body 121, but the disclosure is not limited in this regard. In some other embodiments, the transmission member 280 may be a gear meshed with the cylindrical outer surface 121a of the main body 121, such that the transmission member 280 can rotate the main body 121 after being driven by the driving unit 230. In some other embodiments, the transmission member 280 may be a roller having a surface with a high coefficient of friction, and the surface is used to contact the cylindrical outer surface 121a of the main body 121, such that the transmission member 280 can rotate the main body 121 after being driven by the driving unit 230.

Figure 6:
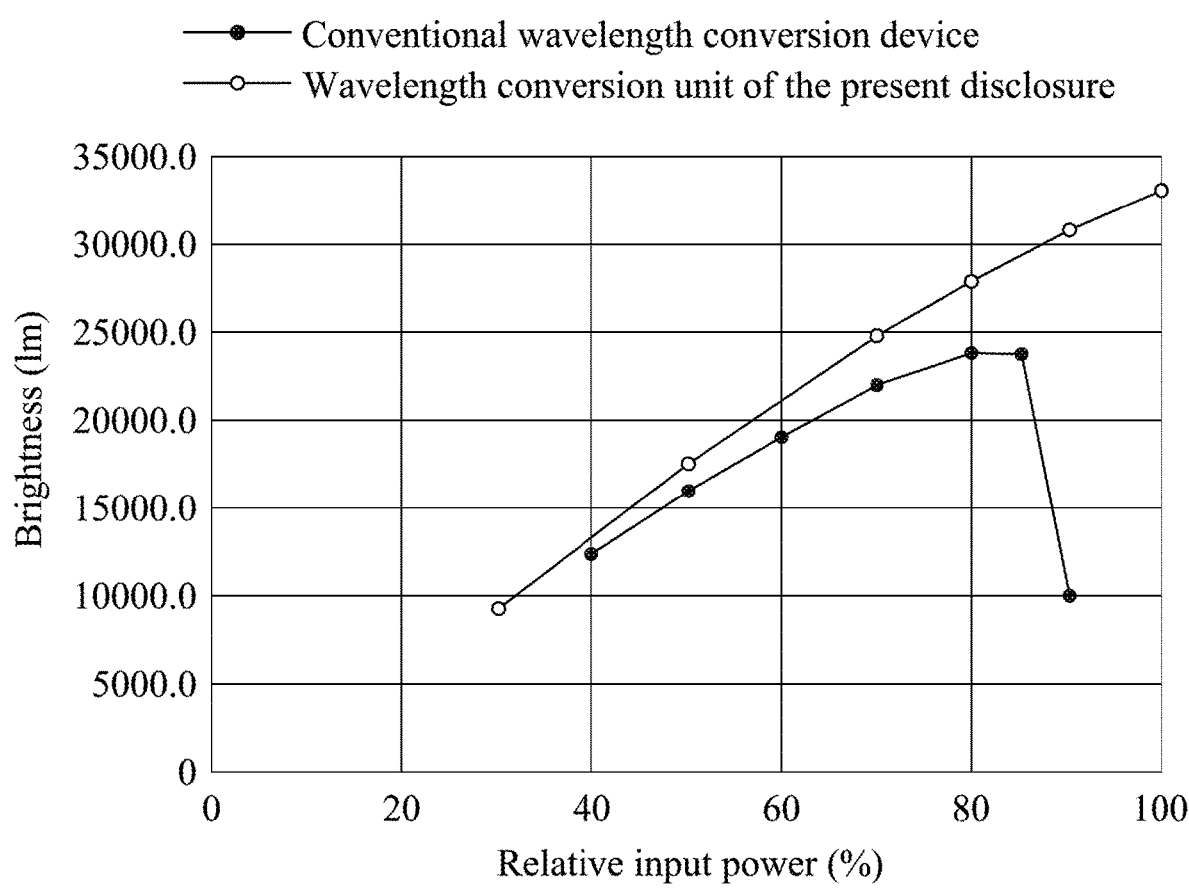
FIG. 6 is a graph showing a relative input power-brightness curve of a wavelength conversion unit of the present disclosure and a conventional wavelength conversion device in an actual test experiment.

Reference is made to FIG. 6. FIG. 6 is a graph showing a relative input power-brightness curve of the wavelength conversion unit 120 of the present disclosure and a conventional wavelength conversion device in an actual test experiment. As shown in FIG. 6, in the actual test experiment, the conventional wavelength conversion device (e.g., an aluminum disk having a diameter of about 65 mm) is coated with a fluorescent powder layer of YAG and irradiated with a laser light source. After the experiment, it can be found that when the relative input power of the laser light source is as high as about 80%, the brightness (lumen value) obtained by measuring the conventional wavelength conversion device with an integrating sphere will reach the upper limit, and the brightness decreases sharply when the relative input power of the laser light source is from about 85% to about 90%.

On the contrary, as shown in FIG. 6, in the actual test experiment, the wavelength conversion unit 120 of the present disclosure (e.g., the main body 121 having a diameter of about 55 mm) is coated with a fluorescent powder layer of YAG and irradiated with the laser light source 140. After the experiment, it can be found that the relative input power of the laser light source 140 and the brightness (lumen value) obtained by the integrating sphere and measured from the wavelength conversion unit 120 will approach a linear relationship. Even if the relative input power of the laser light source 140 reaches more than 90%, there is no obvious decrease in the corresponding brightness, so it is obvious that the wavelength conversion unit 120 of the present disclosure does have an excellent heat-dissipation effect. Moreover, as shown in FIG. 6, under the condition that the diameter of the main body 121 is smaller than the diameter of the aluminum disk of the conventional wavelength conversion device, the light emitting performance of the wavelength conversion unit 120 of the present disclosure is superior to the conventional wavelength conversion device in terms of brightness and durability.

Figure 7:
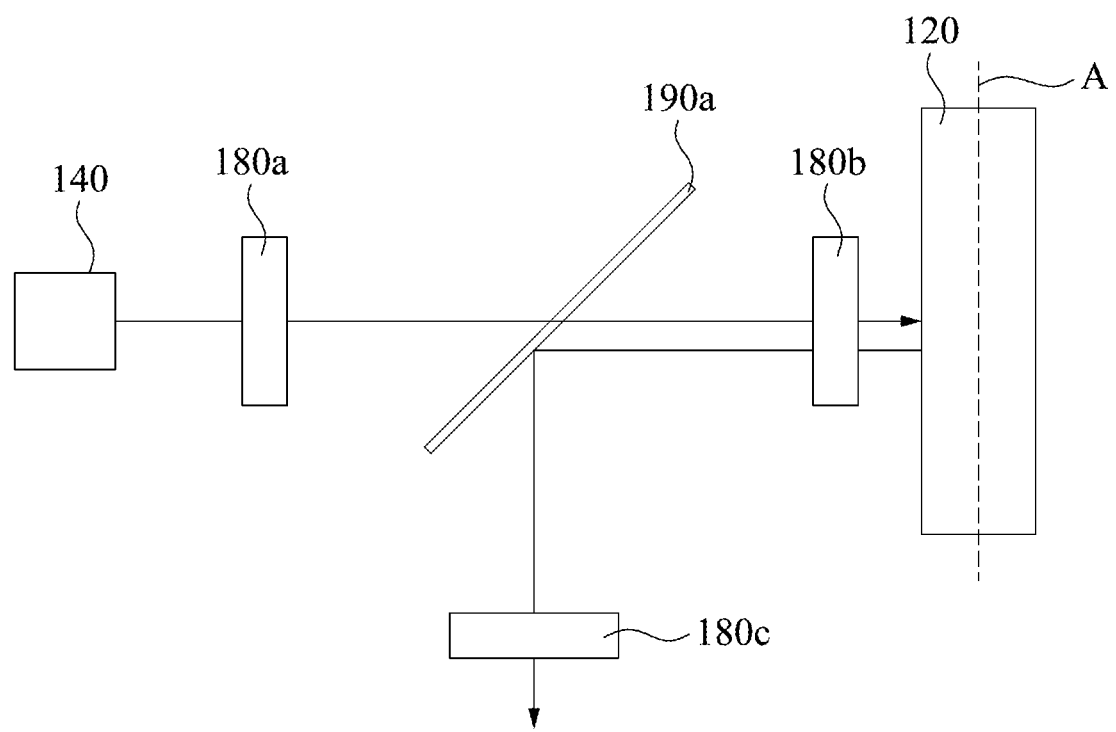
FIG. 7 is a schematic diagram of certain components included in the lighting device according to an embodiment of the present disclosure.

Reference is made to FIG. 7. FIG. 7 is a schematic diagram of certain components included in the lighting device 100 according to an embodiment of the present disclosure. As shown in FIG. 7, in the present embodiment, the lighting device 100 further includes lenses 180a, 180b, 180c, and a beam splitter 190a. Specifically, the beam splitter 190a is located between the light source 140 and the wavelength conversion unit 120. The lens 180a is located between the light source 140 and the beam splitter 190a. The lens 180b is located between the beam splitter 190a and the wavelength conversion unit 120. The beam splitter 190a is configured to allow the light emitted by the light source 140 to pass through (i.e., allowing the excitation light to pass through), and configured to reflect the light converted by the wavelength conversion unit 120 (i.e., reflecting the excited light). Whether light can pass through the beam splitter 190a is based on whether the wavelength range of the light falls within the wavelength range allowed by the beam splitter 190a, and the principle will not be described in detail here. Hence, the light emitted by the light source 140 will reach the wavelength conversion unit 120 sequentially via the lens 180a, the beam splitter 190a, and the lens 180b. The light converted by the wavelength conversion unit 120 will reach the beam splitter 190a via the lens 180b, and then be reflected by the beam splitter 190a to pass through the lens 180c and outputted.

Figure 8:
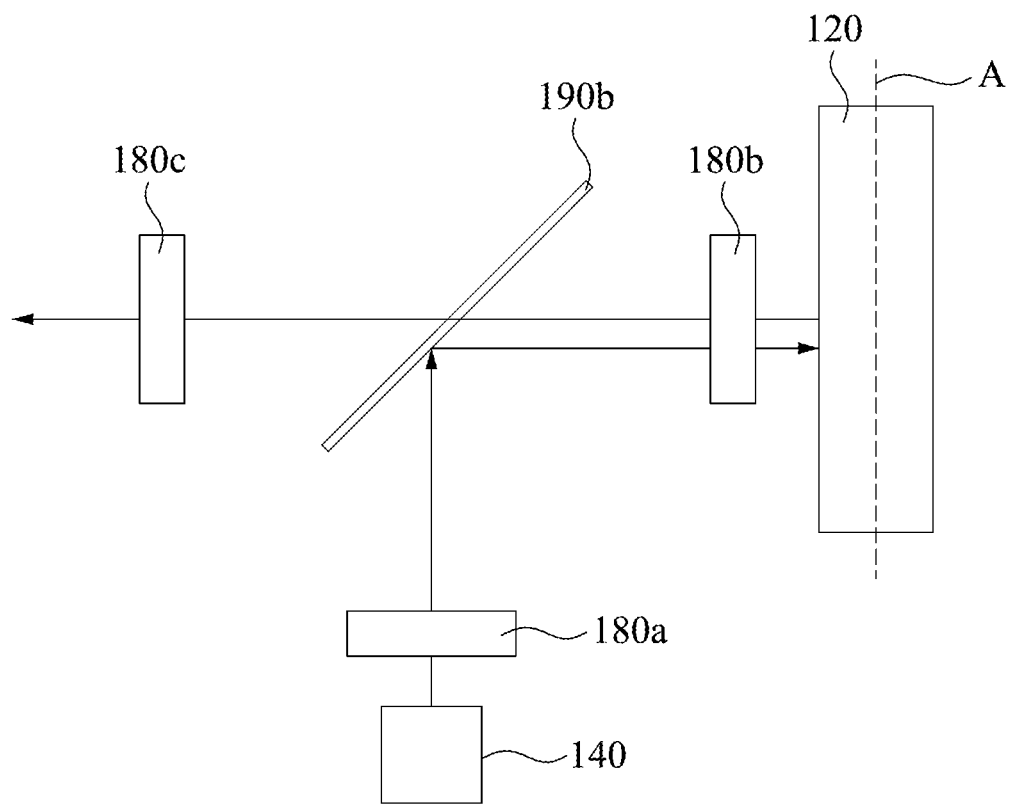
FIG. 8 is a schematic diagram of certain components included in the lighting device according to an embodiment of the present disclosure.

Reference is made to FIG. 8. FIG. 8 is a schematic diagram of certain components included in the lighting device 100 according to an embodiment of the present disclosure. As shown in FIG. 8, in the present embodiment, the lighting device 100 further includes lenses 180a, 180b, 180c, and a beam splitter 190b. Specifically, the lens 180a is located between the light source 140 and the beam splitter 190b. The beam splitter 190b is located between the lenses 180b, 180c. The beam splitter 190b is configured to reflect the light emitted by the light source 140 (i.e., reflecting the excitation light), and configured to allow the light converted by the wavelength conversion unit 120 to pass through (i.e., allowing the excited light to pass through). Hence, the light emitted by the light source 140 will reach the wavelength conversion unit 120 via the lens 180a, and then be reflected by the beam splitter 190b to reach the wavelength conversion unit 120 via the lens 180b. The light converted by the wavelength conversion unit 120 will sequentially pass through the lens 180b, the beam splitter 190b, and the lens 180c and be outputted.

Figure 9:
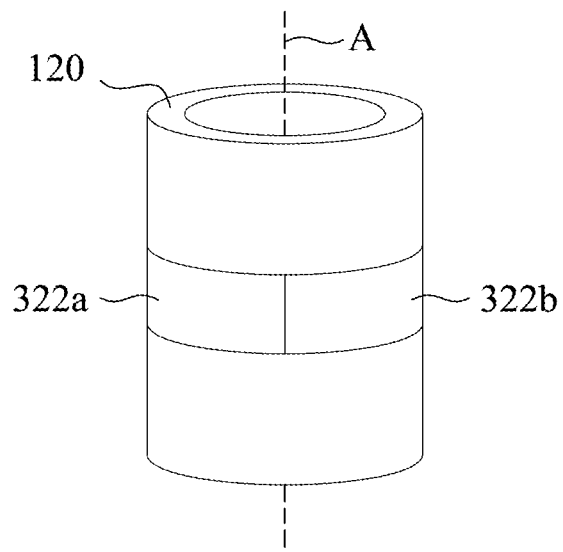
FIG. 9 is a schematic diagram of a wavelength conversion unit according to an embodiment of the present disclosure.

It should be pointed out that in addition to including a single fluorescent section, the fluorescent powder layer 122 may also include a plurality of fluorescent sections on which different fluorescent powders are disposed for certain requirements. Reference is made to FIG. 9. FIG. 9 is a schematic diagram of a wavelength conversion unit 320 according to an embodiment of the present disclosure. As shown in FIG. 9, in the present embodiment, the wavelength conversion unit 320 includes a main body 121 and a plurality of fluorescent sections 322a, 322b. The fluorescent sections 322a, 322b are annularly arranged around the axis A. The fluorescent powders respectively on the fluorescent sections 322a, 322b are different. For example, the fluorescent powders are green and yellow fluorescent powders. Hence, with the rotation of the main body 121, the excitation light will be sequentially converted into a green excited light and a yellow excited light.

Figure 10:
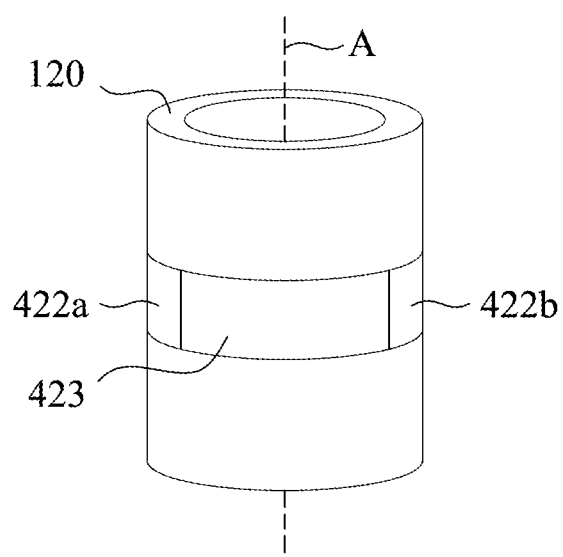
FIG. 10 is a schematic diagram of a wavelength conversion unit according to an embodiment of the present disclosure.

Reference is made to FIG. 10. FIG. 10 is a schematic diagram of a wavelength conversion unit 420 according to an embodiment of the present disclosure. As shown in FIG. 10, in the present embodiment, the wavelength conversion unit 420 includes a main body 121, fluorescent sections 422a, 422b, and a reflective section 423. Different fluorescent powders are disposed on the fluorescent sections 422a, 422b to convert the excitation light into excited light of different colors. The fluorescent sections 422a, 422b and the reflective section 423 are annularly arranged around the axis A. As a result, as the main body 121 rotates, the wavelength conversion unit 420 can sequentially generate the excited light and reflect the excitation light and output them to the back end.

According to the foregoing recitations of the embodiments of the disclosure, it can be seen that a wavelength conversion unit of which a main body has a cylindrical outer surface and a lighting device using the wavelength conversion unit are provided in the present disclosure. Compared with a conventional wavelength conversion device in which the fluorescent powder layer is coated on the front side of the color wheel disk, since the fluorescent powder layer of the wavelength conversion unit of the present disclosure is coated on the cylindrical outer surface, the lateral space occupied by the wavelength conversion unit can be effectively reduced. The main body of the wavelength conversion unit of the present disclosure can also be a hollow cylinder, that is, the main body has a through channel through which a thermal fluid (e.g., gas or liquid) can flow, and the through channel can be used as a heat-dissipating passage. In addition, the wavelength conversion unit of the present disclosure can further include a blade group disposed in the through channel. When a driving unit drives the main body to rotate, the blade group located in the through channel will also force the thermal fluid to pass through the through channel at the same time. Therefore, the wavelength conversion unit of the present disclosure can effectively dissipate a large amount of thermal energy generated when a light source (e.g., a laser light source) irradiates the fluorescent powder layer, and reduce the temperature of the fluorescent powder layer. In some embodiments in which the driving unit is connected to the blade group, the forced air can also dissipate the heat of the driving unit at the same time. Furthermore, since the lighting device of the present disclosure does not need to provide a heat exchange module in the inner housing, the overall volume of the inner housing can be smaller than those of prior arts, which is beneficial to the layout of internal components of the lighting device using the wavelength conversion unit of the present disclosure.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A wavelength conversion unit, comprising:
    a main body having a cylindrical outer surface and a through channel, wherein the cylindrical outer surface surrounds the through channel;
    a fluorescent powder layer disposed on the cylindrical outer surface; and
    a blade group disposed in the through channel and fixed to the main body.

2. The wavelength conversion unit of claim 1, wherein a material of the fluorescent powder layer comprises aluminate, silicate, nitride, or quantum dots.

3. The wavelength conversion unit of claim 1, wherein a material of a binder used in the fluorescent powder layer comprises silicone, epoxy resin, aluminum oxide, or aluminum nitride.

4. A lighting device, comprising:
    a wavelength conversion unit comprising:
        a main body having a cylindrical outer surface; and
        a fluorescent powder layer disposed on the cylindrical outer surface;
    a driving unit configured to drive the wavelength conversion unit to rotate around an axis, wherein the cylindrical outer surface surrounds the axis; and
    a light source configured to emit light toward the fluorescent powder layer.

5. The lighting device of claim 4, wherein the main body has a through channel, and the cylindrical outer surface surrounds the through channel.

6. The lighting device of claim 5, wherein the wavelength conversion unit further comprises a blade group disposed in the through channel and fixed to the main body.

7. The lighting device of claim 6, wherein the driving unit is connected to the blade group.

8. The lighting device of claim 4, wherein the through channel has a first opening and a second opening opposite to each other, and the lighting device further comprises:
    a pipeline having a first end and a second end, the first end and the second end being respectively coupled to the first opening and the second opening, such that the through channel and the pipeline together form a fluid path; and
    a thermal fluid located in the fluid path.

9. The lighting device of claim 8, wherein the thermal fluid is gas or liquid.

10. The lighting device of claim 8, further comprising:
    a first engaging member rotatably engaged and hermetically communicated between the first opening and the first end of the pipeline; and
    a second engaging member rotatably engaged and hermetically communicated between the second opening and the second end of the pipeline.

11. The lighting device of claim 8, further comprising a heat exchange module thermally connected to the pipeline.

12. The lighting device of claim 4, further comprising a transmission member engaged with the cylindrical outer surface, wherein the driving unit drives the wavelength conversion unit to rotate through the transmission member.

13. A lighting device, comprising:
    a light source configured to generate an excitation light;
    a wavelength conversion unit having at least one fluorescent section with fluorescent powder for converting the excitation light into an excited light, wherein the wavelength conversion unit is configured to rotate about an axis, and a direction in which the excitation light is emitted to the wavelength conversion unit is orthogonal to the axis; and
    a beam splitter configured to reflect the excitation light and allow the excited light to pass through, or configured to reflect the excited light and allow the excitation light to pass through.

14. The lighting device of claim 13, wherein the at least one fluorescent section is plural in number, the fluorescent sections are annularly arranged around the axis, and the fluorescent powders respectively on the fluorescent sections are different.

15. The lighting device of claim 13, wherein the wavelength conversion unit further has a reflective section, and the at least one fluorescent section and the reflective section are annularly arranged around the axis.

16. The lighting device of claim 13, further comprising a driving unit configured to drive the wavelength conversion unit to rotate around the axis.

17. The lighting device of claim 13, wherein the wavelength conversion unit has a through channel.

18. The lighting device of claim 17, further comprising a blade group configured to rotate to drive a fluid through the through channel.

19. The lighting device of claim 18, wherein the blade group is disposed in the through channel and fixed to the wavelength conversion unit.

* * * * *